(12) United States Patent
Takashima et al.

(10) Patent No.: US 6,937,010 B1
(45) Date of Patent: Aug. 30, 2005

(54) MAGNETIC DETECTOR

(75) Inventors: Akira Takashima, Tokyo (JP);
Masahiro Yokotani, Tokyo (JP); Izuru Shinjo, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/978,466

(22) Filed: Nov. 2, 2004

(30) Foreign Application Priority Data

Jun. 15, 2004 (JP) ............................. P2004-176723

(51) Int. Cl.[7] .............................................. G01B 7/30
(52) U.S. Cl. ......................... 324/207.25; 324/207.21; 324/252; 324/174
(58) Field of Search ..................... 324/207.13, 207.21, 324/207.23, 207.25, 244, 249, 252, 260–261, 324/173–174; 361/813; 257/421–422, 690

(56) References Cited

U.S. PATENT DOCUMENTS 5,637,995 A * 6/1997 Izawa et al. ................ 324/174

2004/0027712 A1   2/2004 Yokotani et al.

FOREIGN PATENT DOCUMENTS

JP          2004-69546 A      3/2004

* cited by examiner

Primary Examiner—Bot LeDynh
(74) Attorney, Agent, or Firm—Sughrue Mion, PLLC

(57) ABSTRACT

A magnetic detector capable of being easily assembled and diminishing fluctuation in magnetic detection accuracy includes: magnetic resistance elements whose resistance value changes according to change in magnetic field generated by rotation of a multi-polarized rotor; an IC formed by integrating a signal processing circuit section that outputs a signal corresponding to multi-polarization of the rotor based on change in resistance values of the magnetic resistance elements; a lead frame mounted with the IC and connected to an external output terminal for externally outputting an output signal from the signal processing circuit section; a magnet applying a bias magnetic field to the magnetic resistance elements; and a magnetic guide for correcting lines of magnetic force from the magnet. The IC, lead frame and magnetic guide are preliminarily assembled to serve as a first assembly, and the magnet and external output terminal are preliminarily assembled to serve as a second assembly.

4 Claims, 11 Drawing Sheets

MAGNETIC DETECTOR

BACKGROUND OF THE INVENTION

1. Field of the Invention

The present invention relates to a magnetic detector for detecting a magnetic field that is generated from a multi-polarized rotor with the use of a magnetic resistance element (MR element) and, more particularly, to a structure of a magnetic detector in which a bias magnetic field is applied to the magnetic resistance element.

2. Description of the Related Art

FIGS. 10(a), (b) and (c) are drawings of a conventional magnetic detector shown, for example, in the Japanese Patent Publication (unexamined) No. 69546/2004. Specifically, FIG. 10(a) is a perspective view conceptually showing a constitution of the conventional magnetic detector. FIG. 10(b) is a diagram taken from a viewpoint P of FIG. 1(a). FIG. 10(c) is a characteristic chart showing a relation between a distance L from the centerline of a bias magnetic field applied to the magnetic resistance element and a bias magnetic field.

Further, FIGS. 11(a), (b), (c), (d) and (e) are timing charts showing operations of the conventional magnetic detector shown in FIG. 10.

In addition, as described later, FIG. 11 also show operations of a magnetic detector according to the invention.

With reference to FIG. 10(a), reference numeral 100 designates a rotor, being a detected body that is multi-polarized. For example, this rotor is a rotary disc provided with a plurality of polarized protrusions at a circumferential portion thereof.

Numerals 30a to 30d designate magnetic resistance elements (they are referred to as magnetic resistance segments as well). Numeral 31 designates a signal processing circuit section in which a circuit is printed on the surface of a board. Numeral 5 designates a magnet. Numeral 90 designates a rotary axis on which the rotor 100 rotates. Numeral 2 designates a magnetic guide.

The magnetic guide 2 functions to correct a direction of lines of magnetic force so that the lines of a magnetic force generated from the magnet 5 efficiently pass through the magnetic resistance elements 30a to 30d.

Additionally, with reference to FIG. 10(a), although the magnetic resistance elements 30a, 30d and the magnetic resistance elements 30b, 30c are indicated by one black block, this is due to the fact that respective magnetic resistance elements densely massed, and each element cannot be illustrated apart from each other.

As shown in FIG. 10(b), the magnetic resistance elements 30a to 30d are disposed on the signal processing circuit section 31 on the side of the rotor 100 in such a manner as to be away from the centerline (in parallel to the rotary axis 90) in a polarization direction of the magnet 5 by a distance L.

In addition, the signal processing circuit section 31 outputs signals responsive to multi-polarization of the rotor 100 based on the change in resistance value of the magnetic resistance elements 30a to 30d due to change in magnetic field.

Further, with reference to FIG. 10(c), an axis of abscissas indicates a distance L from the centerline of a bias magnetic field provided by the magnet 5; and an axis of ordinates indicates a bias magnetic field (applied magnetic field) to be applied to the magnetic resistance elements.

As shown in FIG. 10(b) and FIG. 10(c), in the magnetic circuit of the conventional magnetic detector, it is possible to appropriately adjust a bias magnetic field with respect to the magnetic resistance elements based on the distance L from the centerline of the magnet 5.

FIG. 11 are timing charts for explaining operations of the magnetic detector shown in FIG. 10.

In the drawings, FIG. 11(a) indicates condition of change in magnetic poles coming close to the magnetic resistance element part (magnetic resistance elements 30a to 30d) due to the fact that the multi-polarized rotor 100 rotates.

Further, FIG. 11(b) shows condition of change in magnetic fields to be applied to the magnetic resistance elements 30a, 30d. FIG. 11(c) indicates condition of change in resistance values of the magnetic resistance elements 30b, 30c. FIG. 11(d) indicates condition of change in output from the later-described differential amplifier circuit of the signal processing circuit section 31. FIG. 11(e) indicates condition of change in final output from the signal processing circuit section 31.

Thus, according to the conventional magnetic detector shown in FIG. 10, output signals corresponding to multi-polarization of the rotor 100 can be obtained.

That is, rotational operation of the rotor 100 that is multi-polarized can be detected.

The above-described conventional magnetic detector includes the magnetic resistance elements 30a to 30d that detects a change in magnetic fields of the rotor 100 that is multi-polarized; the signal processing circuit section 31 that outputs signals corresponding to multi-polarization of the rotor 100 based on a resistance value of the magnetic resistance elements 30a to 30d due to the change in magnetic fields; the magnet 5 that applies a bias magnetic field to the magnetic resistance elements 30a to 30d; and the magnetic guide 2 that corrects a direction of the lines of magnetic force generated from the magnet 5.

In such a conventional magnetic detector, respective magnetic resistance elements, signal processing circuit section, magnet, and magnetic guide forming a magnetic circuit are components each separately independent of each other.

Accordingly, a problem exists in that number of parts is large, and many processes of assembling are required at the time of manufacturing, whereby any efficient production cannot be carried out.

Moreover, individual parts are manually assembled, so that relative positional accuracy in individual parts at the time of assembling is likely to be negatively affected.

Consequently, in completed product, the fluctuation in characteristics such as magnetic detection accuracy of the multi-polarized rotor cannot be diminished, going beyond a certain level.

SUMMARY OF THE INVENTION

Accordingly, an object of the present invention is to provide a magnetic detector easy to be assembled at the time of manufacturing, and in which fluctuation in characteristics such as magnetic detection accuracy of a rotor is diminished.

A magnetic detector according to the invention includes: magnetic resistance elements of which resistance value changes in response to change in magnetic field generated by rotation of a multi-polarized rotor; an IC formed by integrating the mentioned magnetic resistance elements and a signal processing circuit section that outputs a signal corresponding to multi-polarization of the mentioned rotor based on change in resistance values of the mentioned magnetic resistance elements; a lead frame on which the mentioned IC is mounted at one end on the side of the mentioned rotor, and to which an external output terminal for outputting an output signal from the mentioned signal processing circuit section to outside is connected at the other end; a magnet applying a bias magnetic field to the mentioned magnetic resistance elements; and a magnetic guide functioning to correct a direction of lines of a magnetic force that is generated from the mentioned magnet.

In this magnetic detector, the mentioned IC, the mentioned lead frame and the mentioned magnetic guide are preliminarily assembled to form an integral one unit serving as a first assembly, and the mentioned magnet and the mentioned external output terminal are preliminarily assembled to form an integral one unit serving as a second assembly.

According to the magnetic detector of above constitution, the IC formed by integrating the magnetic resistance elements and the signal processing circuit section, the lead frame on which the IC is mounted at one end and to which an external output terminal for outputting an output signal from the signal processing circuit section to outside is connected at the other end, and the magnetic guide have preliminarily been assembled into an integral one unit serving as the first assembly. Likewise the magnet applying a bias magnetic field to the magnetic resistance element and the external output terminal have preliminarily been assembled into an integral one unit serving as the second assembly. As a result, the magnetic detector is easy to be assembled at the time of manufacturing; and it is possible to diminish the fluctuation in characteristics such as detection accuracy.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
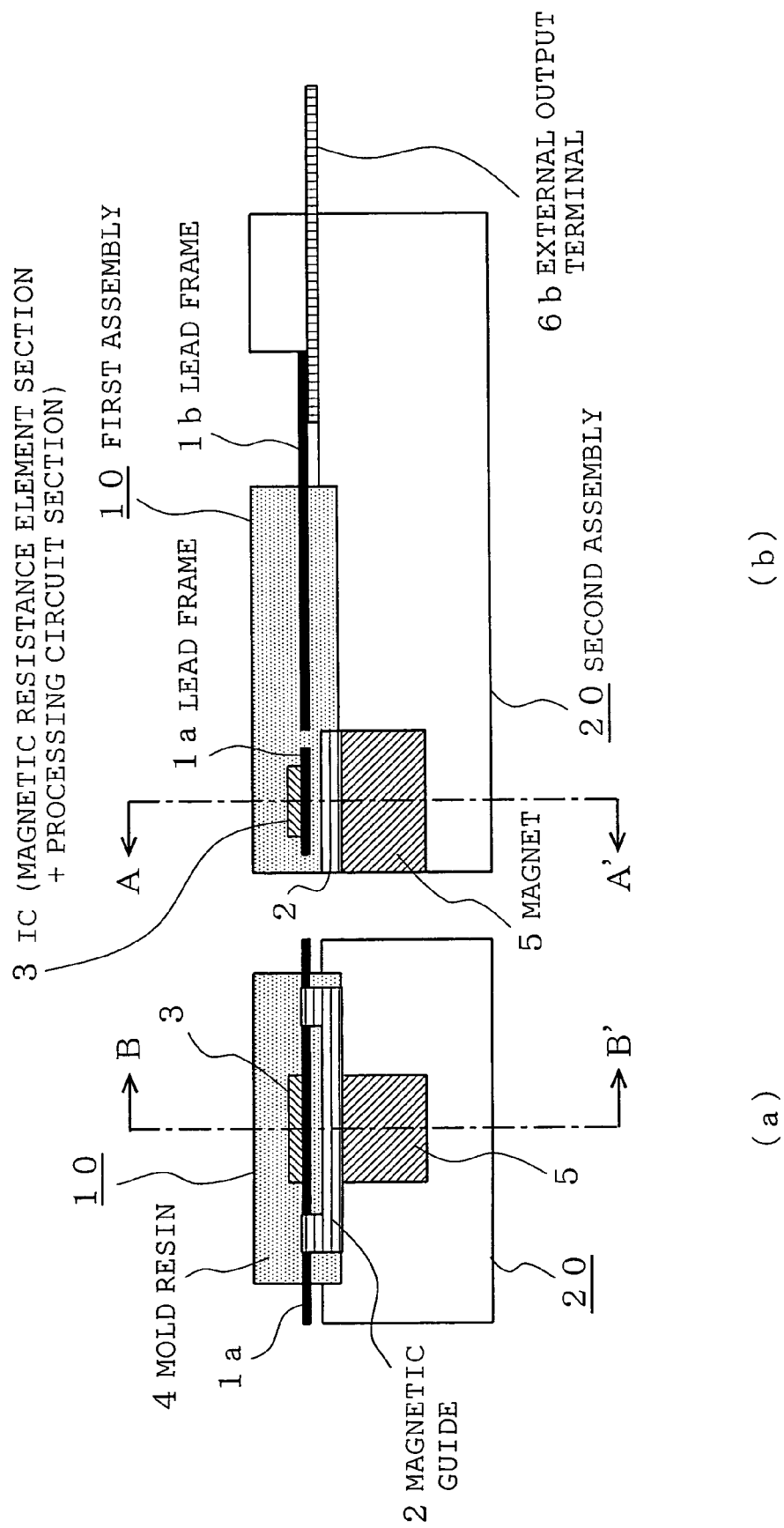
FIGS. 1(*a*) and (*b*) are cross sectional views each showing a constitution of a magnetic detector according to a first preferred embodiment of the present invention.

With reference to the accompanying drawings, several preferred embodiments of the present invention are hereinafter described.

In the drawings, like reference numerals indicate the same or like parts.

Embodiment 1

FIGS. 1(*a*) and (*b*) are cross sectional views showing a constitution of a magnetic detector according to a first preferred embodiment. FIG. 1(*a*) shows a cross section taken along the line A–A' of FIG. 1(*b*). FIG. 1(*b*) shows a cross section taken along the line B–B' of FIG. 1(*a*).

Figure 2:
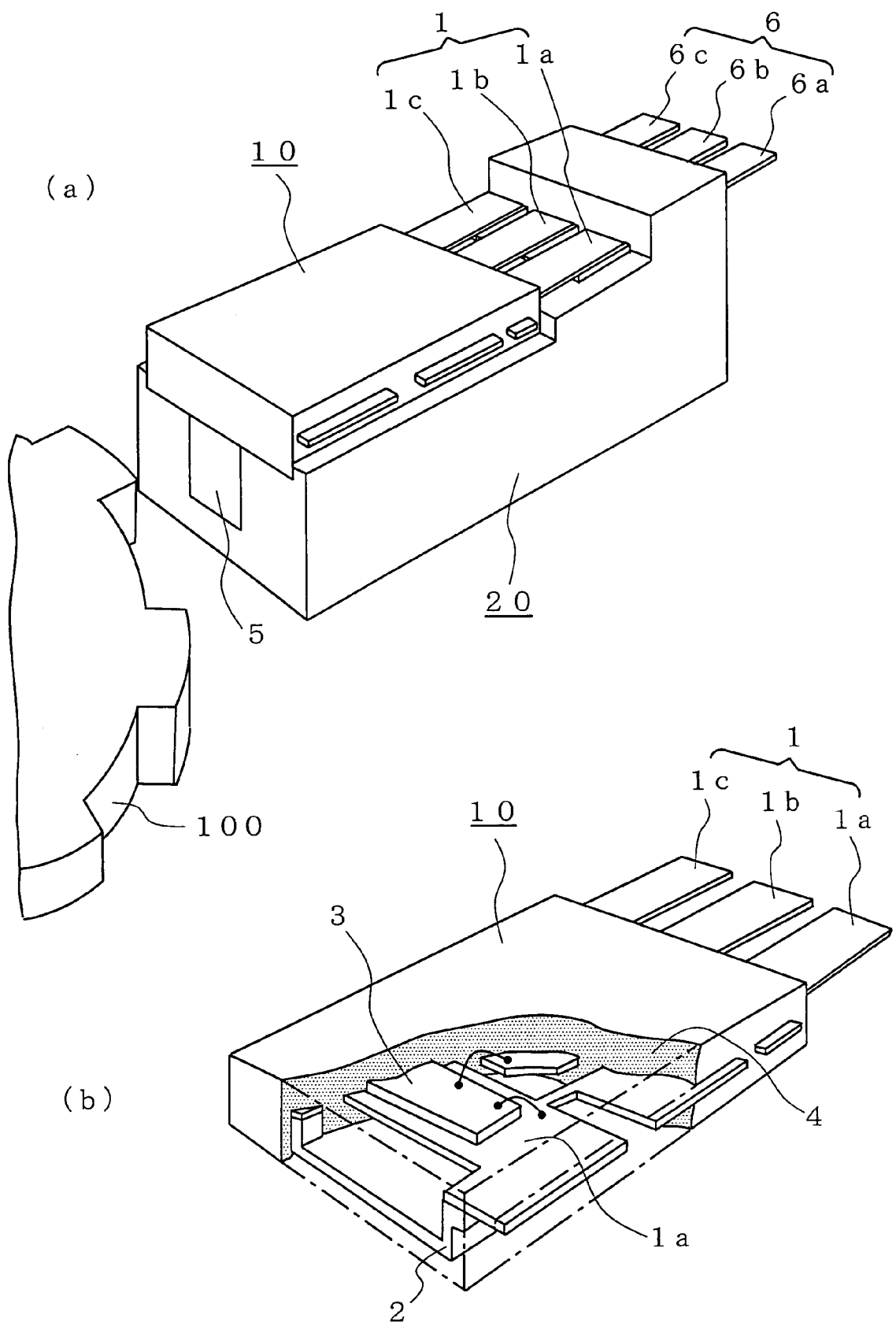
FIGS. 2(*a*) and (*b*) are perspective views each showing the constitution of the magnetic detector according to the first embodiment of the invention.

FIGS. 2(*a*) and (*b*) are perspective views showing the constitution of the magnetic detector according to the first embodiment. FIG. 2(*a*) shows an external appearance of the magnetic detector. FIG. 2(*b*) shows an internal constitution of the essential part (the later-described first assembly).

Figure 3:
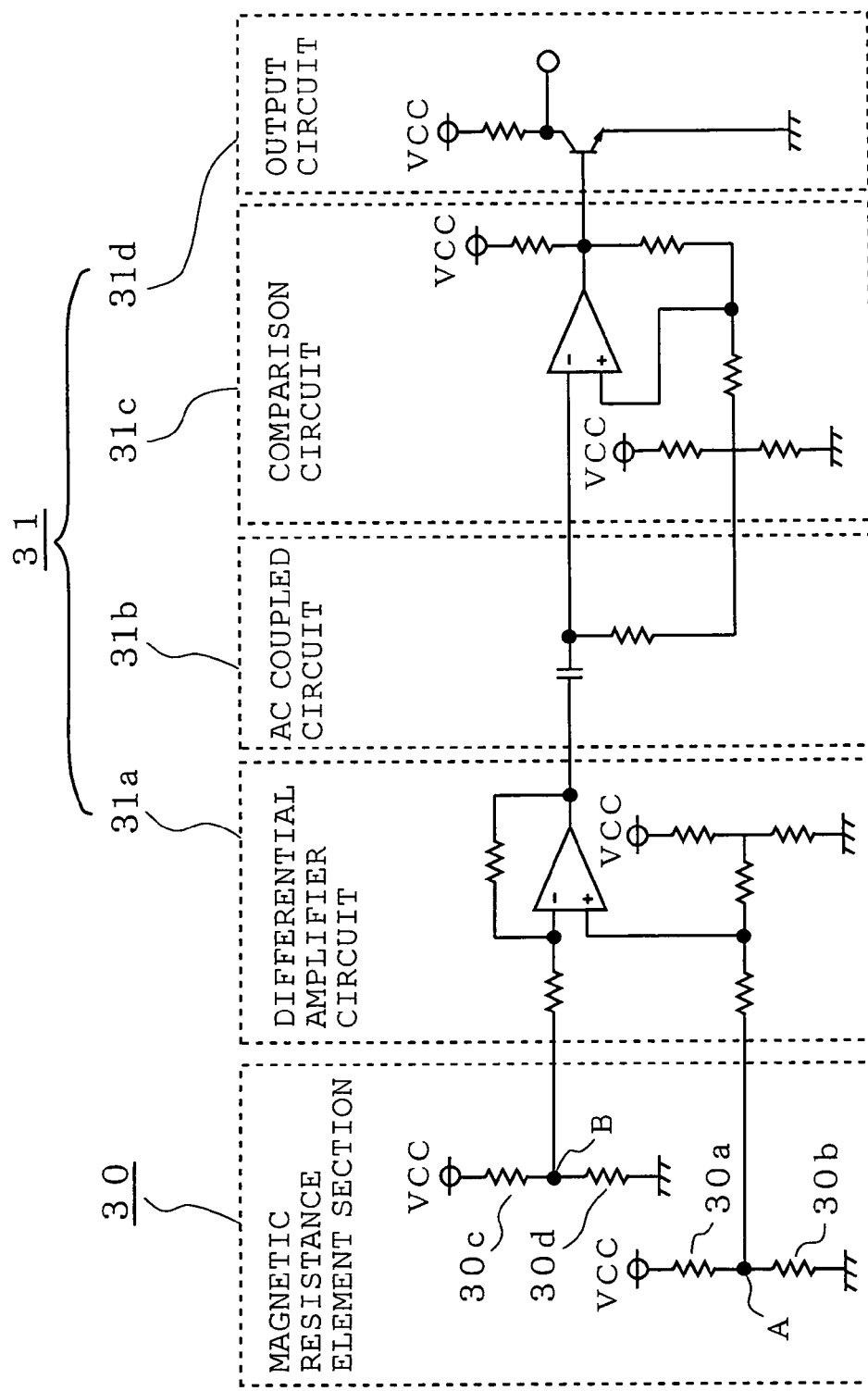
FIG. 3 is a circuit diagram showing an example of a circuit arrangement of an IC for use in the magnetic detector.

FIG. 3 is a diagram showing an example of a circuit arrangement of an IC for use in the magnetic detector.

With reference to FIGS. 1 to 3, the constitution of the magnetic detector according to the invention is described.

Referring to FIG. 2, numeral 100 designates a rotor, being a detected body that is multi-polarized. For example, this rotor is a rotary disc provided with a plurality of polarized protrusions at a circumferential portion thereof.

Numeral 3 designates an IC formed by integrating a magnetic resistance element section 30 consisting of magnetic resistance elements 30*a* to 30*d* of which resistance value is changed in response to change in magnetic fields of the multi-polarized rotor 100, and a signal processing circuit section 31 outputting signals corresponding to multi-polarization of the rotor 100 based on the change in resistance values of the magnetic resistance elements 30*a* to 30*d*.

Numeral 4 designates a mold resin.

Numeral 5 designates a magnet for applying a bias magnetic field to the magnetic resistance elements 30*a* to 30*d*. Numeral 2 designates a magnetic guide for correcting a direction of the lines of magnetic force so that the lines of magnetic force generated from the magnet 5 efficiently pass through the magnetic resistance elements 30*a* to 30*d*.

As shown in FIG. 3, the magnetic resistance element section 30 consists of the magnetic resistance elements 30*a*, 30*b* that are connected in series, and the magnetic resistance elements 30*c*, 30*d* that are connected in series.

Each of the magnetic resistance elements 30*a* to 30*d* is changed in resistance value responsive to the change in magnetic fields of the rotor 100, so that an electric potential at junction points A, B of the magnetic resistance elements changes as well.

In addition, a relative positional relation between these rotor 100, magnetic resistance elements 30*a* to 30*d*, signal processing circuit section 31, magnet 5 and magnetic guide 2 is basically the same as in the above-described conventional magnetic detector.

The signal processing circuit section 31 consists of a differential amplifier circuit 1*a*, to which an electric potential at the junction point A of the magnetic resistance elements 30*a*, 30*b* that are connected in series and an electric potential at the junction point B of the magnetic resistance elements 30c, 30d that are connected in series are inputted, an AC coupled circuit 31b, a comparison circuit 31c, and an output circuit 31d.

Thus, the signal processing circuit section 31 outputs signals corresponding to multi-polarization of the rotor 100 based on the change in resistance values of the magnetic resistance elements 30a to 30d.

Additionally, an individual arrangement and operation of the magnetic resistance element section 30 and signal processing circuit section 31 are the same as in the above-described conventional magnetic detector.

Figure 10:
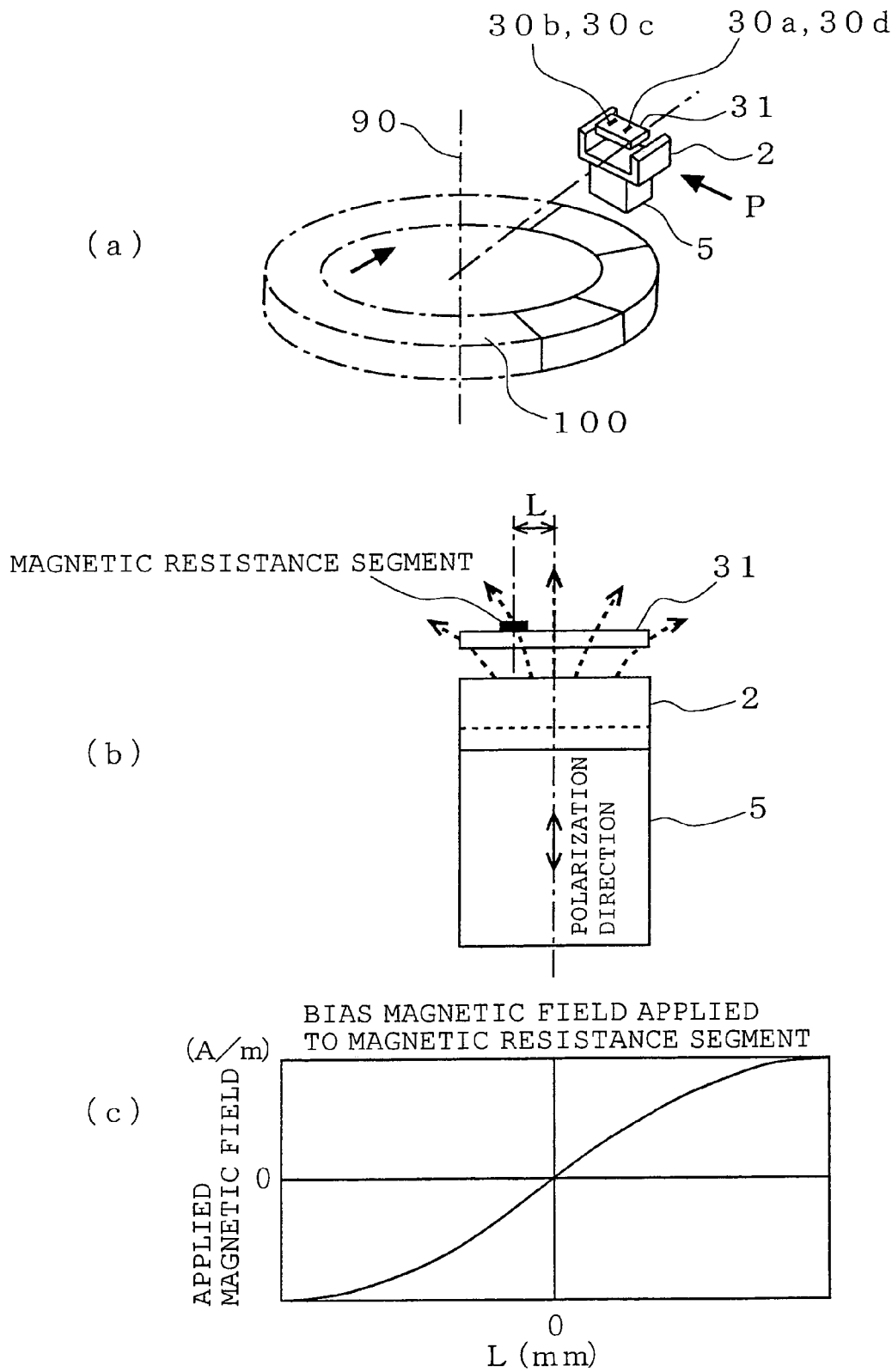
FIGS. 10(*a*), (*b*) and (*c*) are schematic views and a chart each showing a constitution of the conventional magnetic detector.
Figure 11:
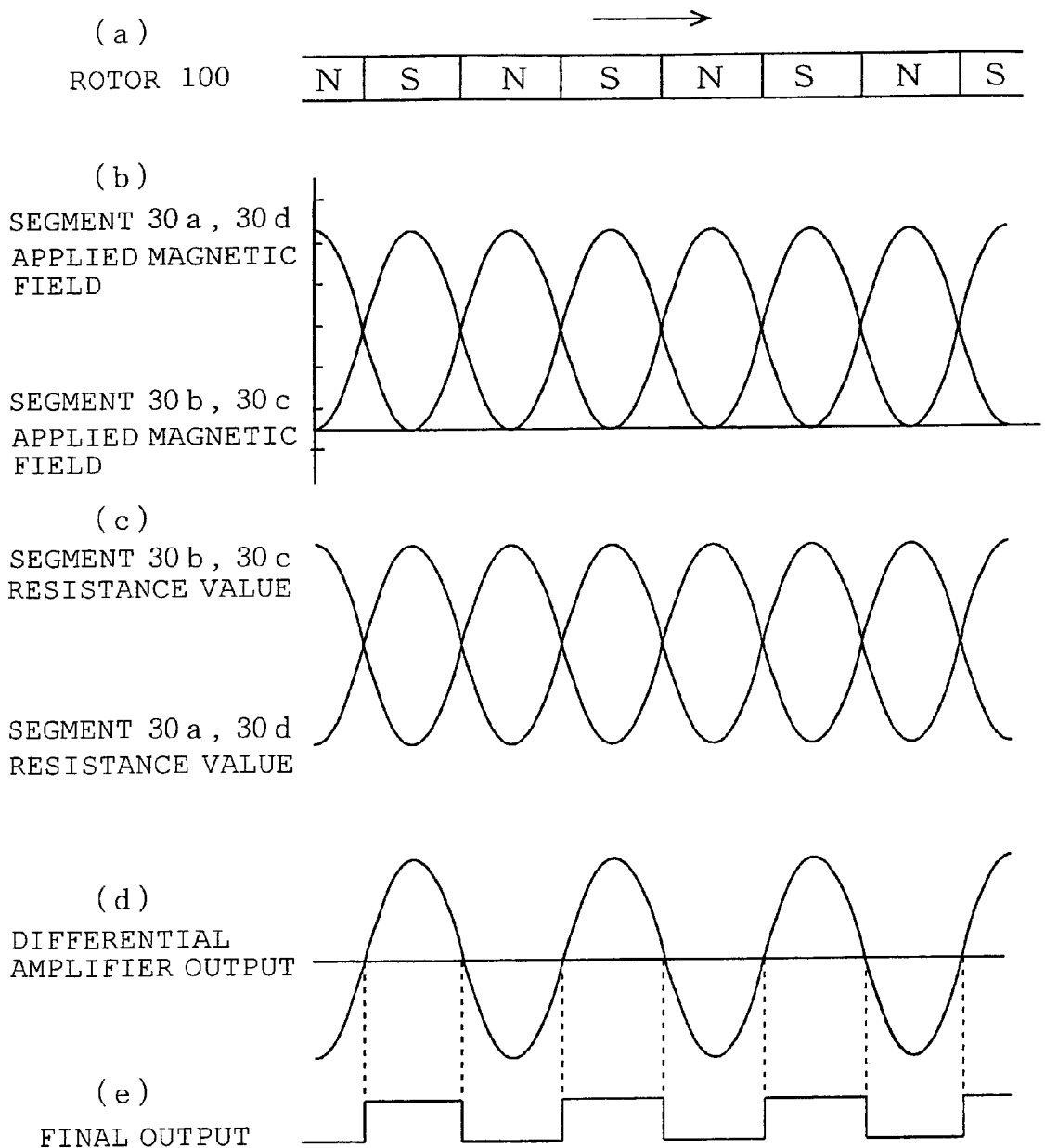
FIGS. 11(*a*), (*b*), (*c*), (*d*) and (*e*) are timing charts each showing operations of the conventional magnetic detector.

With reference to FIGS. 10 and 11 having been used in the foregoing description of the conventional magnetic detector, operations of the magnetic detector according to this first embodiment are described.

Likewise in the magnetic detector according to this first embodiment, as shown in FIG. 10(b), the magnetic resistance elements 30a to 30d are provided on the signal processing circuit section 31 on the side of the rotor 100, in such a manner as to be away from the centerline in a polarization direction of the magnet 5 by a distance L.

Further, the signal processing circuit section 31 outputs signals corresponding to multi-polarization of the rotor 100 based on the change in resistance values of the magnetic resistance elements 30a to 30d due to change in magnetic field.

With reference to FIG. 10(c), an axis of abscissas indicates a distance L from the centerline of a bias magnetic field provided by the magnet 5; and an axis of ordinates indicates a bias magnetic field (applied magnetic field) to be applied to the magnetic resistance element.

As shown in FIGS. 10(b) and (c), in the magnetic circuit of the magnetic detector according to this first embodiment, it is possible to appropriately adjust a bias magnetic field with respect to the magnetic resistance element depending on the distance L from the centerline of the magnet 5.

With reference to the timing charts of FIGS. 11(a), (b), (c), (d) and (e), operations of the magnetic detector according to the first embodiment shown in FIGS. 1 and 2 are described.

In the drawings, FIG. 11(a) indicates condition of change in magnetic poles coming close to the magnetic resistance element part (magnetic resistance elements 30a to 30d) due to the fact that the multi-polarized rotor 100 rotates.

Further, FIG. 11(b) shows condition of change in magnetic fields to be applied to the magnetic resistance element 30a, 30d. FIG. 11(c) indicates condition of change in resistance values of the magnetic resistance element 30b, 30c. FIG. 11(d) indicates condition of change in output from the later-described differential amplifier circuit of the signal processing circuit section 31. FIG. 11(e) indicates condition of change in final output from the signal processing circuit section 31.

Thus, according to the magnetic detector according to this first embodiment shown in FIGS. 1 and 2, output signals corresponding to multi-polarization of the rotor 100 can be obtained.

That is, rotational operation of the rotor 100 that is multi-polarized can be detected.

Referring now to FIGS. 1 and 2, numeral 1 designates a lead frame composed of a material of coppers (for example, brass). This lead frame 1 consists of a first lead frame 1a, a second lead frame 1b, and a third lead frame 1c.

Any one of these three lead frames (i.e., the first lead frame 1a, the second lead frame 1b, and the third lead frame 1c) functions to provide a power supply for driving a circuit of the signal processing circuit section 31; any one of them functions to provide a ground (GND) electric potential; and any one of them functions to fetch out an output signal from the processing circuit section 31.

As shown in the drawings, according to this first embodiment, for example, one end of the first lead frame 1a (it is preferable to be any of the one for supplying the power source, the one for ground supplying, and the one for fetching out outputs) extends to a position opposite to the magnet 5 on the side of the rotor 100.

Further, the IC 3 formed by integrating the magnetic resistance elements 30a to 30d and the signal processing circuit section 31 are disposed on an extending part of the first lead frame 1a at a position opposite to the magnet 5.

Furthermore, the magnetic guide 2 is bent by approximately 90 degrees at an end portion thereof in the direction perpendicular to the lead frame 1 (i.e., the first lead frame 1a, the second lead frame 1b, and the third lead frame 1c).

Now, features of the magnetic detector according to the first embodiment are hereinafter described in detail.

With reference to FIGS. 1 and 2, numeral 10 designates a first assembly. This first assembly 10 is formed by preliminarily fixing, with the use of a mold resin 4, the IC 3 formed by integrating the magnetic resistance elements 30a to 30d and the signal processing circuit section 31 into one unit; the lead frame 1 including the first lead frame 1a on which the foregoing IC 3 is disposed; and the magnetic guide 2. In other words, the IC 3, the lead frame 1 and the magnetic guide 2 are integrally molded to each other with the use of the mold resin 4 to form the first assembly 10.

Numeral 20 designates a second assembly preliminarily constructed such that the magnet 5 for applying a bias magnetic field to the magnetic resistance elements 30a to 30d and an external output terminal 6 consisting of three external output terminals (a first external output terminal 6a, a second external output terminal 6b, and a third external output terminal 6c) form an integral one unit. This second assembly 20 is provided with a notch part serving to place and mount the first assembly 10 at a predetermined position.

The first assembly is built in and mounted on the notch part of the second assembly 20, thereby the IC 3, the magnet 5, and the magnetic guide 2 being placed at a determined position.

By mounting the first assembly 10 on the notch part of the second assembly 20, the first, second and third lead frames 1a, 1b and 1c come to be in contact with the first, second and third external output terminals 6a, 6b and 6c respectively, and are electrically connected.

According to this first embodiment, the magnetic guide 2 that is integrally molded with the first assembly 10 is constructed so that a part thereof is exposed and is in a close contact with the magnet 5.

As described above, the magnetic detector according to this first embodiment comprises: magnetic resistance elements 30a to 30d of which resistance value changes in response to change in magnetic field generated by rotation of a multi-polarized rotor 100; an IC 3 formed by integrating the mentioned magnetic resistance elements 30a to 30d and a signal processing circuit section 31 that outputs a signal corresponding to multi-polarization of the mentioned rotor 100 based on change in resistance values of the mentioned magnetic resistance elements 30a to 30d; a lead frame 1 on which the mentioned IC 3 is mounted at one end on the side of the mentioned rotor 100, and to which an external output terminal for outputting an output signal from the mentioned signal processing circuit section 31 to outside is connected at the other end; a magnet 5 applying a bias magnetic field to the mentioned magnetic resistance elements 30a to 30d;

and a magnetic guide 2 functioning to correct a direction of lines of a magnetic force that is generated from the mentioned magnet 5. In this magnetic detector, the mentioned IC 3, the mentioned lead frame 1 and the mentioned magnetic guide 2 are preliminarily assembled to form an integral one unit serving as a first assembly 10, and the mentioned magnet 5 and the mentioned external output terminal 6 are preliminarily assembled to form an integral one unit serving as a second assembly 20.

According to the conventional magnetic detector, displacement is likely to occur in a relative positional relation between respective parts at the time of assembling, and therefore any change occurs in bias magnetic field that pass through the magnetic resistance elements. Consequently, a stable output cannot be obtained at a predetermined position of a detection target (that is, rotor).

On the other hand, according to this first embodiment, the IC, lead frame and magnetic guide are preliminarily assembled forming an integral one unit serving as the first assembly. Consequently, it becomes possible for the magnetic resistance elements and the magnetic guide to be built-in in a highly accurate relative position, thereby enabling to considerably diminish the fluctuation in detection accuracy of the magnetic detector.

Further, in the magnetic detector according to this first embodiment, since a plurality of parts forming a magnetic circuit including the magnetic resistance elements are preliminarily constructed forming an integral one unit serving as the first assembly and the second assembly, resulting in reduction in numbers of parts of the assembly, as well as less assembling steps.

That is, in the magnetic detector according to this first embodiment, not only it is easy to assemble the magnetic detector in the manufacturing but also it is possible to diminish the fluctuation in characteristics such as detection accuracy.

Embodiment 2

FIGS. 4(a) and (b) are cross sectional views each showing constitution of a magnetic detector according to a second preferred embodiment of the invention. FIG. 4(a) shows a cross section taken along the line A–A' of FIG. 4(b). FIG. 4(b) shows a cross section taken along the line B–B' of FIG. 4(a).

FIGS. 5(a) and (b) are perspective views each showing the constitution of the magnetic detector according to the second embodiment. FIG. 5(a) shows an external appearance of the magnetic detector. FIG. 5(b) shows an internal constitution of an essential part (first assembly).

Figure 4:
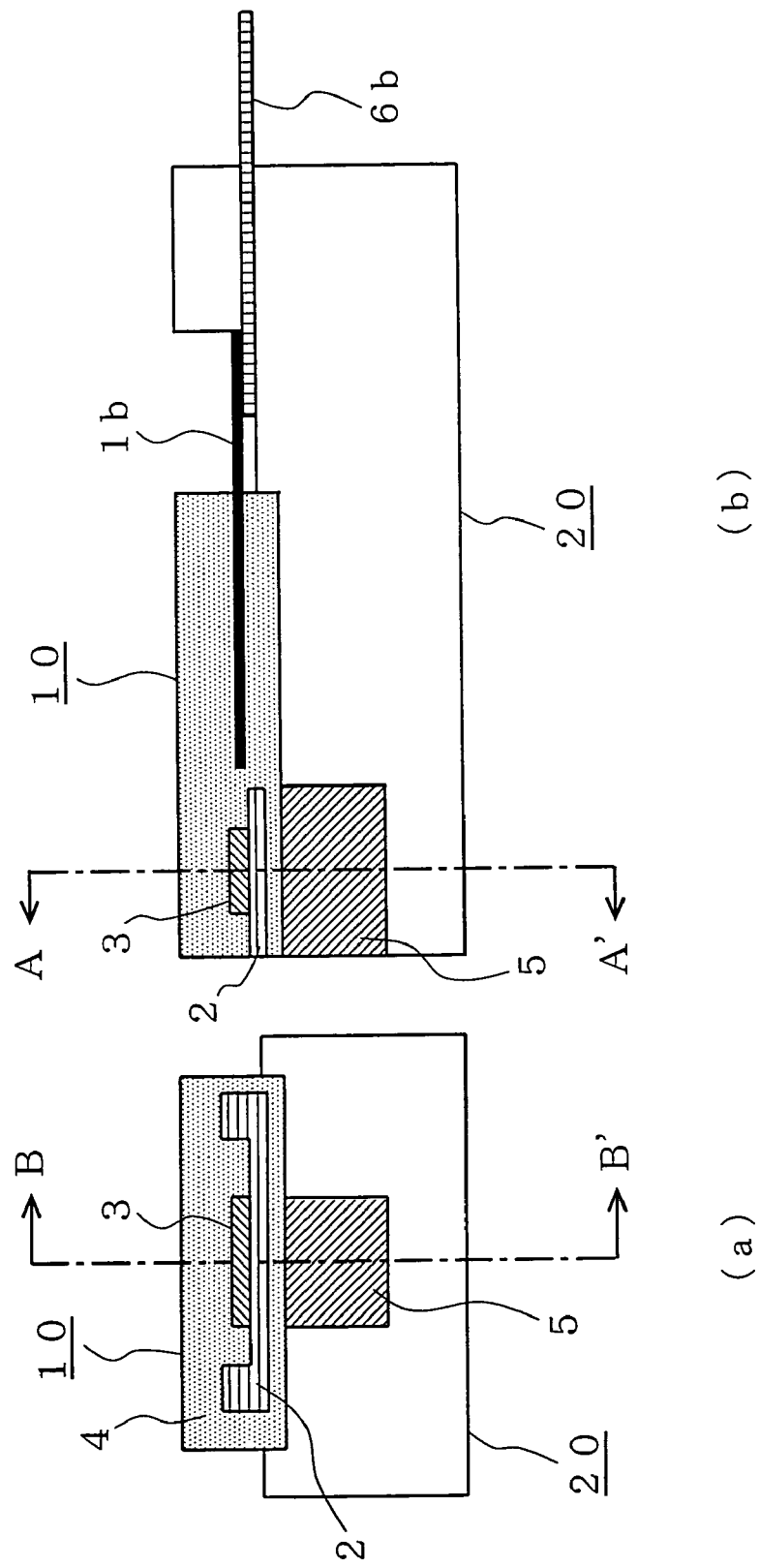
FIGS. 4(*a*) and (*b*) are cross sectional views each showing a constitution of a magnetic detector according to a second preferred embodiment of the invention.
Figure 5:
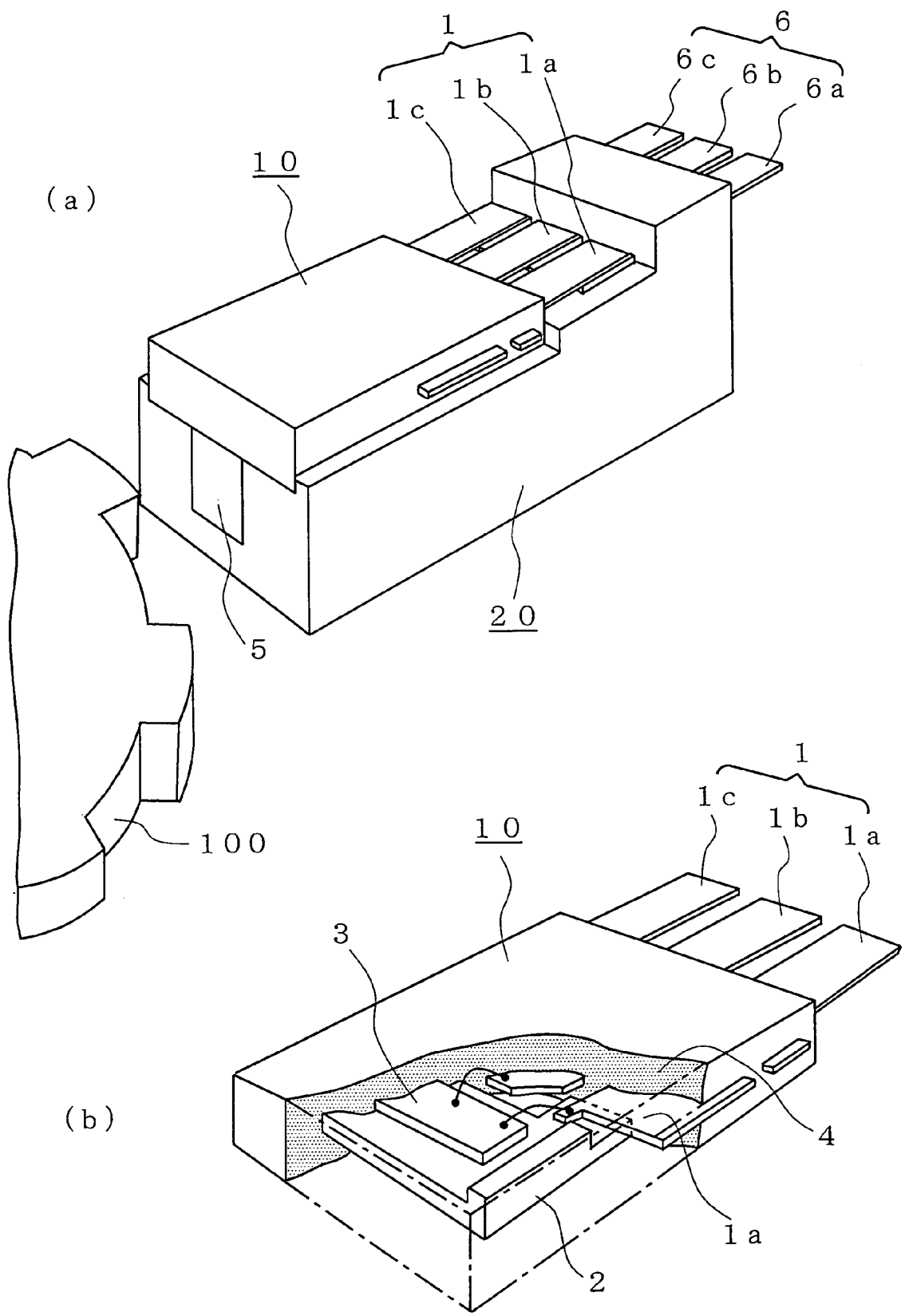
FIGS. 5(*a*) and (*b*) are perspective views each showing the constitution of the magnetic detector according to the second embodiment.

As shown in FIGS. 4 and 5, in the magnetic detector according to this second embodiment, an IC 3 formed by integrating a magnetic resistance element section 30 consisting of magnetic resistance elements 30a to 30d and a signal processing circuit section 31 that outputs signals corresponding to multi-polarization of the rotor based on the change of resistance values of the magnetic resistance elements 30a to 30d, is not mounted on an extending part formed at one end of the lead frame 1 (for example, a first lead frame 1a) on the side of the rotor 100, but is directly disposed on the magnetic guide 2. The other constitutions are the same as in the magnetic detector according to the foregoing first embodiment, so that further descriptions thereof are omitted.

The magnetic detector according to this second embodiment comprises: magnetic resistance elements 30a to 30d of which resistance value changes in response to change in magnetic field generated by rotation of a multi-polarized rotor 100; an IC 3 formed by integrating the mentioned magnetic resistance elements 30a to 30d and a signal processing circuit section 31 that outputs a signal corresponding to multi-polarization of the mentioned rotor 100 based on change in resistance values of the mentioned magnetic resistance elements 30a to 30d; a lead frame 1 connected to an external output terminal 6 for outputting an output signal from the mentioned signal processing circuit section 31 to outside; a magnet 5 applying a bias magnetic field to the mentioned magnetic resistance elements 30a to 30d; and a magnetic guide 2 on which the IC 3 is mounted and which functions to correct a direction of lines of a magnetic force that is generated from the mentioned magnet 5. In this magnetic detector, the mentioned IC 3, the mentioned lead frame 1 and the mentioned magnetic guide 2 are preliminarily assembled to form an integral one unit serving as a first assembly 10, and the mentioned magnet 5 and the mentioned external output terminal 6 are preliminarily assembled to form an integral one unit serving as a second assembly 20.

According to this second embodiment, since the IC 3 is directly built in the magnetic guide 2 without any lead frame 1 being interposed, the fluctuation in thickness of the lead frame 1 is a matter of indifference, and the fluctuation in distance between the magnet 5 and the IC 3 (that is, fluctuation in distance between the magnet 5 and the magnetic resistance elements 30a to 30d) is diminished.

Consequently, the fluctuation in magnetic detection accuracy comes to be smaller than in the magnetic detector according to the foregoing first embodiment.

Embodiment 3

FIGS. 6(a) and (b) are cross sectional views each showing a constitution of a magnetic detector according to a third preferred embodiment of this invention. FIG. 6(a) shows a cross section taken along the line A–A' of FIG. 6(b). FIG. 6(b) shows a cross section taken along the line B–B' of FIG. 6(a).

FIGS. 7(a) and (b) are perspective views each showing the constitution of the magnetic detector according to this third embodiment. FIG. 7(a) shows an external appearance of the magnetic detector. FIG. 7(b) shows an internal constitution of an essential part (first assembly).

Figure 6:
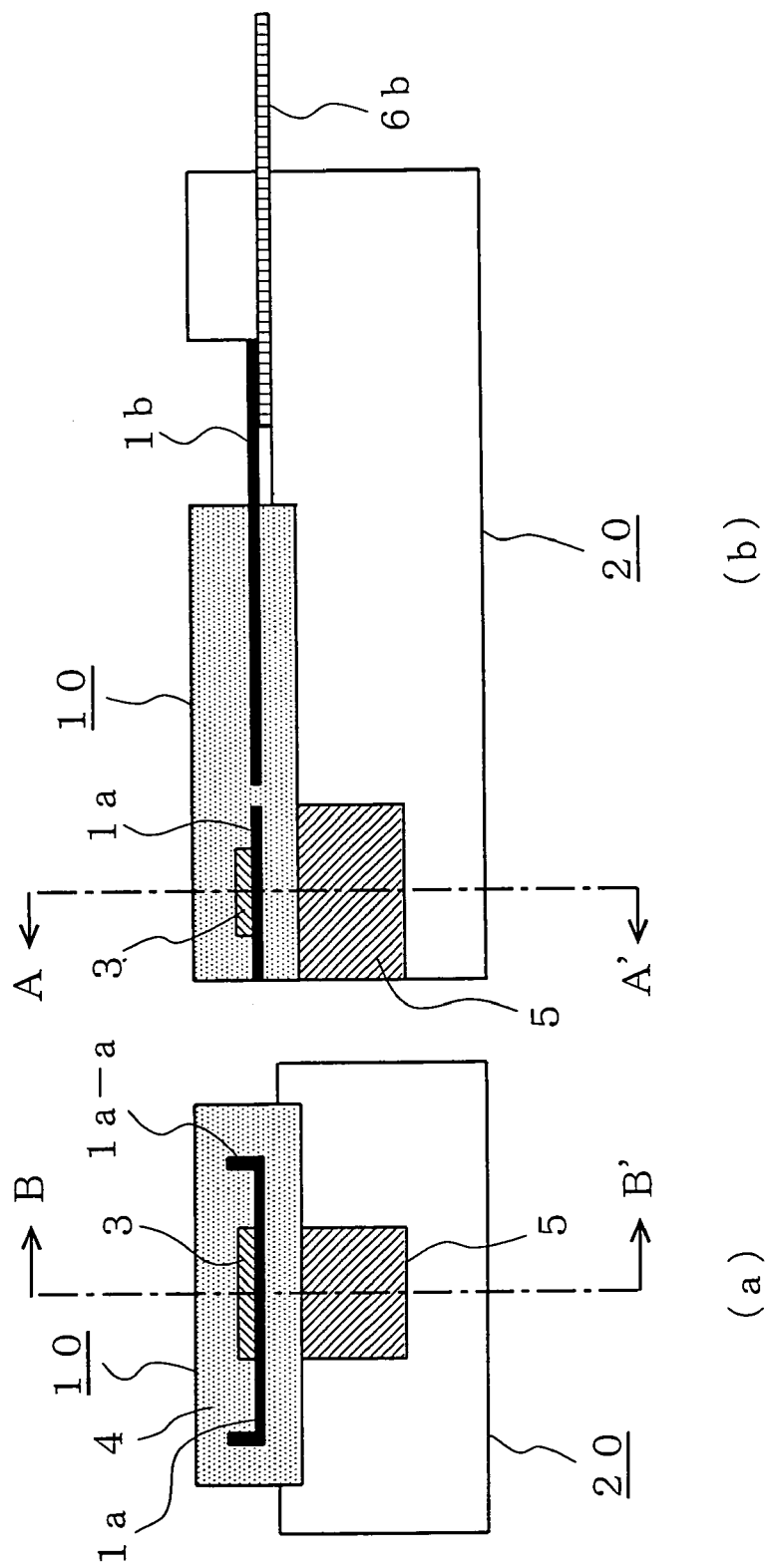
FIGS. 6(*a*) and (*b*) are cross sectional views each showing a constitution of a magnetic detector according to a third preferred embodiment.
Figure 7:
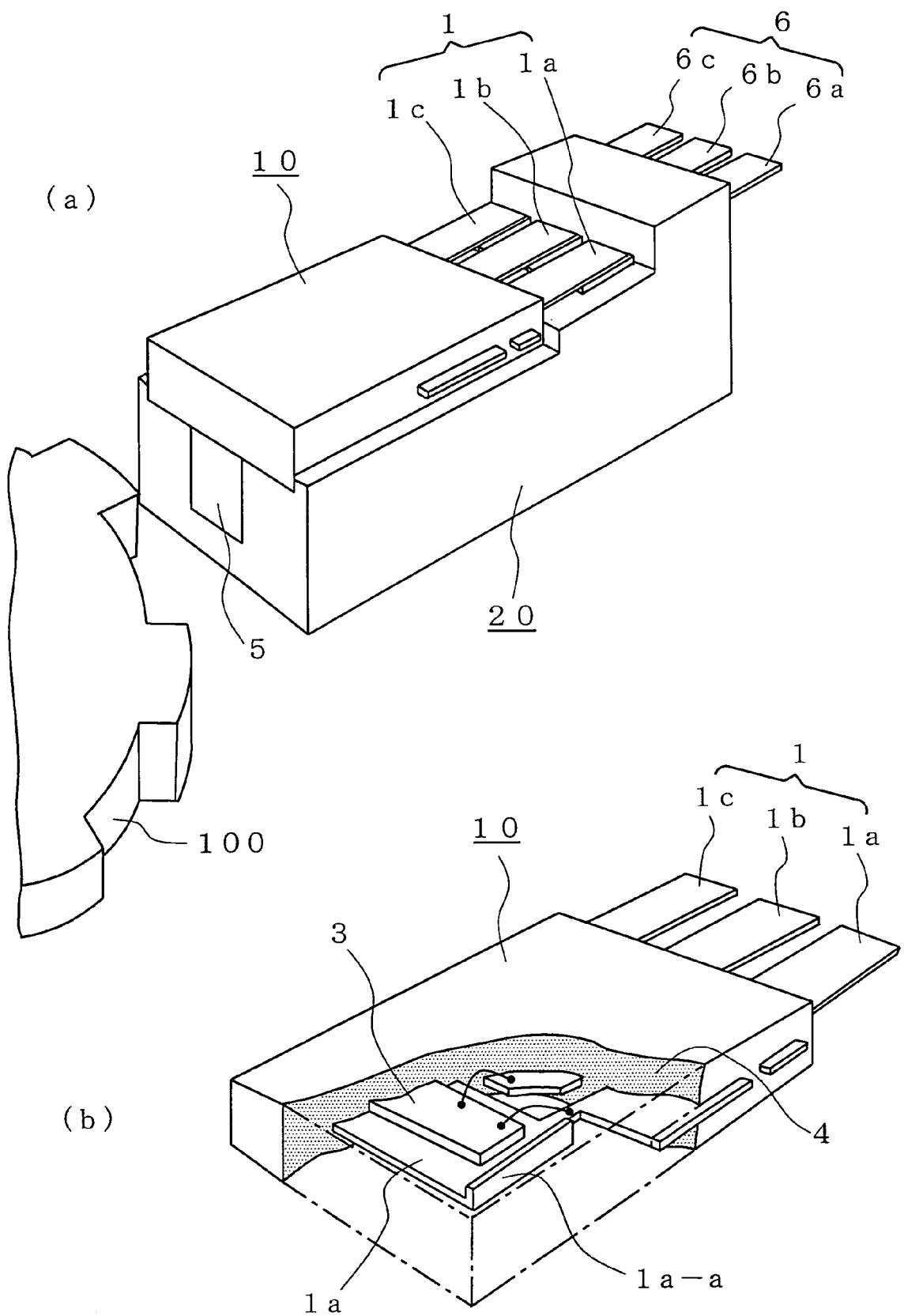
FIGS. 7(*a*) and (*b*) are perspective views each showing the constitution of the magnetic detector according to the third embodiment of the invention.

As shown FIGS. 6 and 7, in the magnetic detector according to this third embodiment, any separate magnetic guide 2 is omitted.

A lead frame (for example, a first lead frame 1a) is extended to such a position that one end thereof on the side of rotor 100 is opposed to the magnet 5. On this extending part, the IC 3 formed by integrating the magnetic resistance elements and the signal processing circuit section 31 is mounted (disposed).

Furthermore, the extending part of the lead frame (for example, the first lead frame 1a) on which the IC 3 is mounted is bent by approximately 90 degrees at the side end portions in a direction perpendicular to the lead frame 1 (the first lead frame 1a, the second lead frame 1b, and the third lead frame 1c).

Additionally, in the drawings, numeral 1a—a designates a bend at the extending part of the first lead frame 1a on which the IC 3 is mounted.

By forming the bend 1a—a at both side ends of the extending part of the first lead frame 1a, it is possible to correct a direction of lines of magnetic force so that the lines of magnetic force generated from the magnet 5 efficiently pass through the magnetic resistance elements 30a to 30d, although there is no magnetic guide 2.

That is, in the magnetic detector according to this third embodiment, there are formed such bends 1a—a at both side end portions of the extending part of the lead frame (for example, the first lead frame 1a) on which the IC 3 formed by integrating the magnetic resistance elements 30a to 30d and signal processing circuit section 31 is mounted, thereby causing the extending part itself of the lead frame to function as the magnetic guide 2.

As described above, the portion of the lead frame 1 of the magnetic detector according to this third embodiment on which the IC 3 is mounted possesses the function of magnetic guide.

Accordingly, according to the third embodiment, the magnetic guide 2 is not necessary, and the number of parts is reduced; and the IC 3 formed by integrating the magnetic resistance elements and the signal processing circuit is directly mounted on the lead frame 1. As a result, the fluctuation in thickness of the magnetic guide 2 is a matter of indifference, the fluctuation in distance between the magnet 5 and the IC 3 (that is, the fluctuation in distance between the magnet and the magnetic resistance elements) is diminished. Consequently, the fluctuation in magnetic detection accuracy comes to be smaller.

Embodiment 4

FIGS. 8(a) and (b) are cross sectional views each showing constitution of a magnetic detector according to a fourth preferred embodiment of the invention. FIG. 8(a) shows a cross section taken along the line A–A' of FIG. 8(b). FIG. 8(b) shows a cross section taken along the line B–B' of FIG. 8(a).

Further, FIGS. 9(a) and (b) are perspective views each showing the constitution of the magnetic detector according to this fourth embodiment. FIG. 9(a) shows an external appearance of the magnetic detector. FIG. 9(b) shows an internal constitution of an essential part (first assembly).

Figure 8:
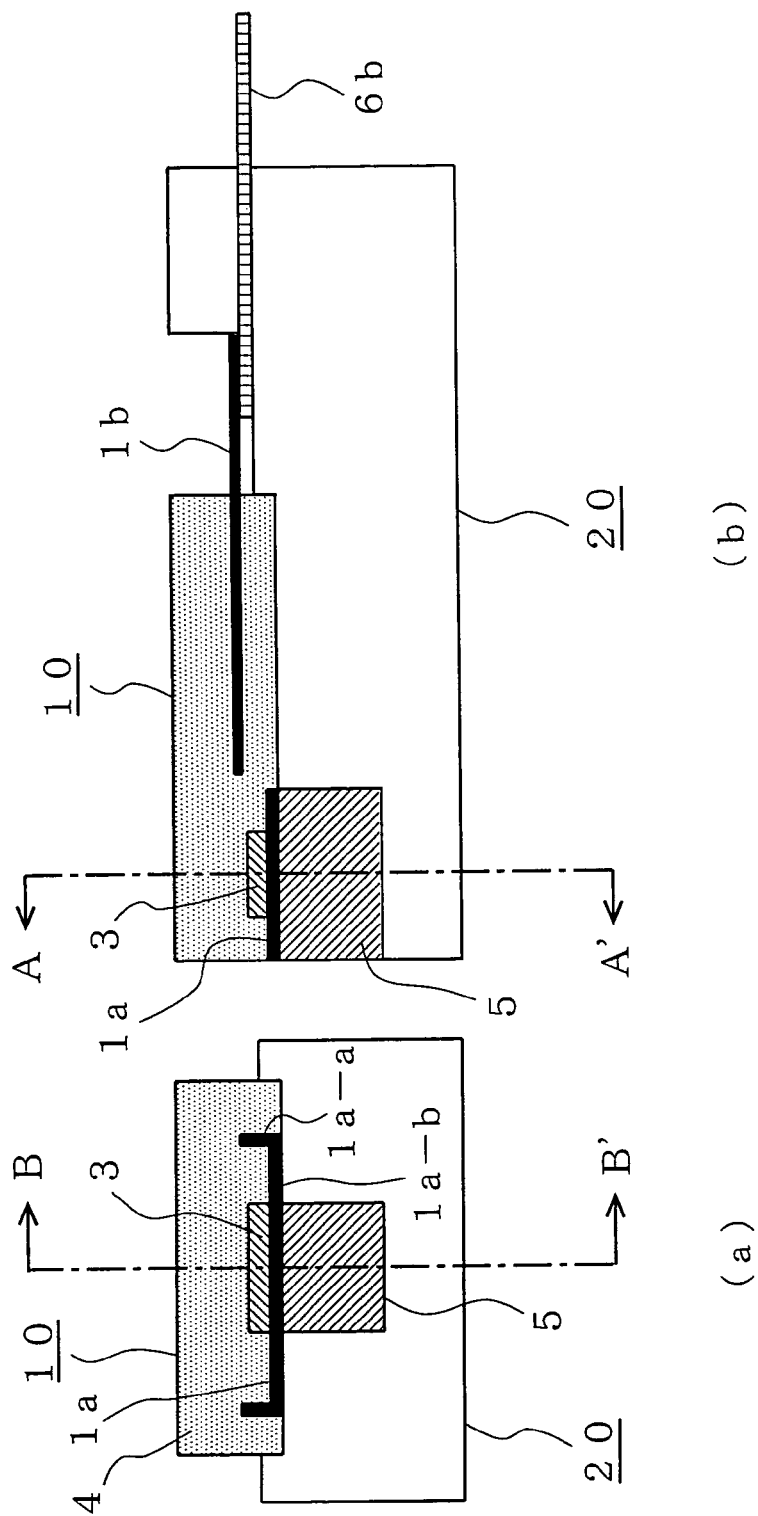
FIGS. 8(*a*) and (*b*) are cross sectional views each showing a constitution of a magnetic detector according to a fourth preferred embodiment of the invention.
Figure 9:
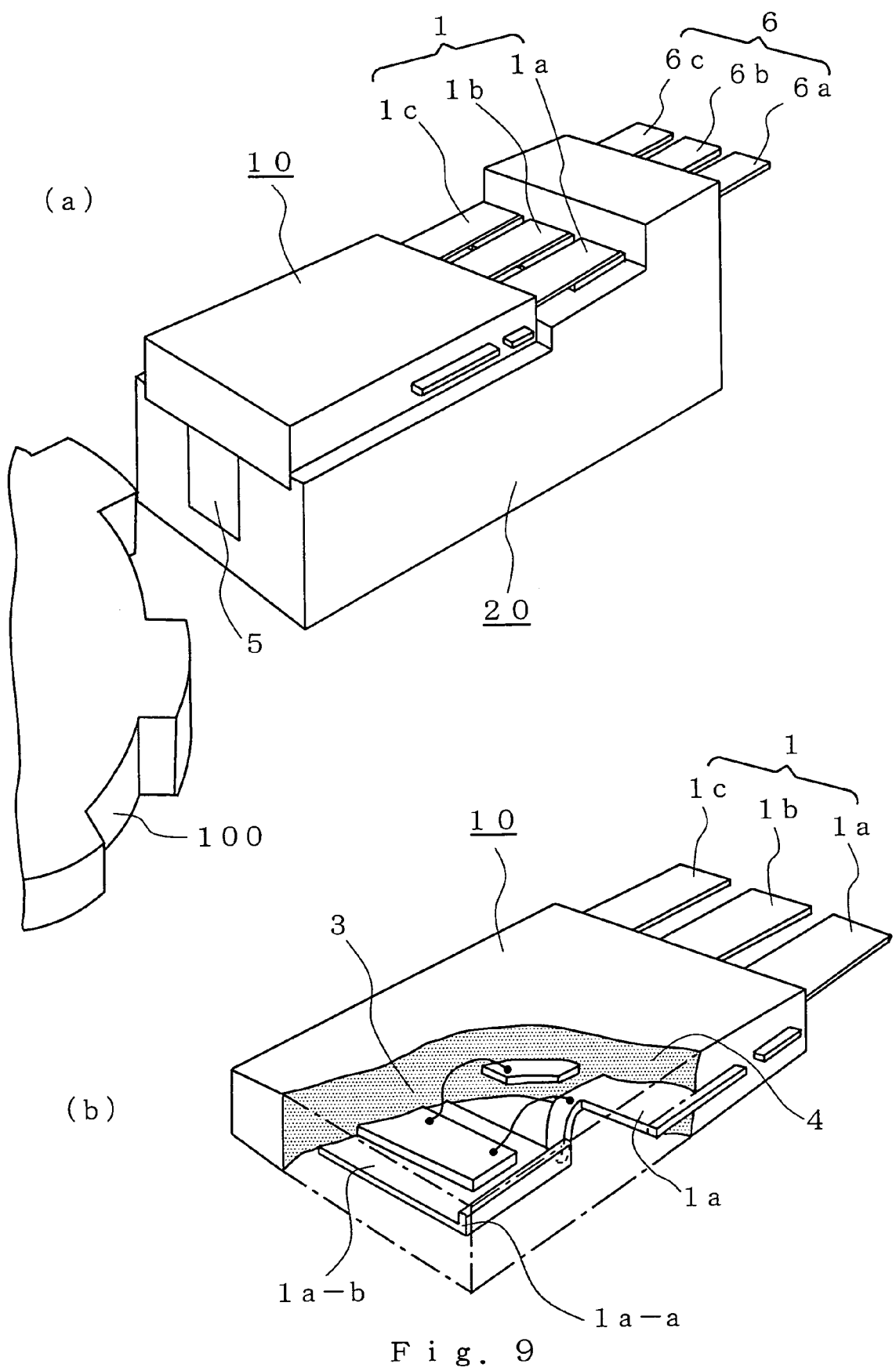
FIGS. 9(*a*) and (*b*) are perspective views each showing the constitution of the magnetic detector according to the fourth embodiment of the invention.

As shown FIGS. 8 and 9, in the magnetic detector according to this fourth embodiment, an extending part of a lead frame (for example, the first lead frame 1a) on which the IC 3 formed by integrating the magnetic resistance elements 30a to 30d and signal processing circuit section 31, is formed having a step (difference in level) with respect to the lead frame body in order to be in a direct contact with the magnet 5 without any mold resin 4 being interposed.

In the drawings, numeral 1a–b designates a step part of the lead frame (for example, the first lead frame 1a).

Further, in the same manner as in the foregoing third embodiment, bends 1a—a are formed at the extending part of the lead frame, being a portion on which the IC 3 is mounted, thereby causing the extending part itself to possess a function of the magnetic guide 2.

Thus, the magnetic detector according to this fourth embodiment is characterized in that a portion of the lead frame on which the IC 3 is mounted is located adjacent to the magnet 5 so as to be in contact with the magnet 5.

As a result, the step needs not necessarily to be formed on the lead frame as described above.

For example, in the magnetic detector according to the foregoing third embodiment, it is preferable that a portion of the mold resin 4 opposite to the magnet 5 is cut off, and a position of the magnet 5 in the second assembly 20 is changed so that a portion of the lead frame 1 on which the IC 3 is mounted (that is, an extending part of the lead frame 1a) is adjacent to the magnet 5.

As described above, in the magnetic detector according to the fourth embodiment, as compared with the magnetic detector according to the foregoing third embodiment, a part of the lead frame on which the IC 3 is mounted is located adjacent to the magnet 5 so as to be in contact with the magnet 5.

Accordingly, according to this fourth embodiment, the magnetic guide 2 is unnecessary, and the number of parts is reduced; and a part of the lead frame on which the IC 3 is mounted is disposed without any mold resin 4 being interposed so as to be in contact with the magnet 5. As a result, the fluctuation in thickness of the magnetic guide 2 is a matter of indifference, and the fluctuation in distance between the magnet 5 and the IC 3 (that is, the fluctuation in the distance between the magnet and the magnetic resistance elements) is diminished. Consequently, the fluctuation in magnetic detection accuracy comes to be smaller.

Furthermore, the magnetic resistance elements within the IC 3 are disposed adjacent to the magnet, so that an intensity of magnetic field of the magnet 5 with respect to the magnetic resistance elements is increased.

Consequently, a size of magnet necessary for obtaining the same magnetic field intensity comes to be smaller, thereby enabling to achieve downsizing the device.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A magnetic detector comprising:
   magnetic resistance elements of which resistance value changes in response to change in magnetic field generated by rotation of a multi-polarized rotor;
   an IC formed by integrating said magnetic resistance elements and a signal processing circuit section that outputs a signal corresponding to multi-polarization of said rotor based on change in resistance values of said magnetic resistance elements;
   a lead frame on which said IC is mounted at one end on the side of said rotor, and to which an external output terminal for outputting an output signal from said signal processing circuit section to outside is connected at the other end;
   a magnet applying a bias magnetic field to said magnetic resistance elements; and
   a magnetic guide functioning to correct a direction of lines of a magnetic force that is generated from said magnet;
   wherein said IC, said lead frame and said magnetic guide are preliminarily assembled to form an integral one unit serving as a first assembly, and said magnet and said external output terminal are preliminarily assembled to form an integral one unit serving as a second assembly.

2. The magnetic detector comprising:
   magnetic resistance elements of which resistance value changes in response to change in magnetic field generated by rotation of a multi-polarized rotor;
   an IC formed by integrating said magnetic resistance elements and a signal processing circuit section that outputs a signal corresponding to multi-polarization of said rotor based on change in resistance values of said magnetic resistance elements;
   a lead frame connected to an external output terminal for outputting an output signal from said signal processing circuit section to outside;

a magnet applying a bias magnetic field to said magnetic resistance elements; and a magnetic guide on which said IC is mounted and which functions to correct a direction of lines of a magnetic force that is generated from said magnet;

wherein said IC, said lead frame and said magnetic guide are preliminarily assembled to form an integral one unit serving as a first assembly, and said magnet and said external output terminal are preliminarily assembled to form an integral one unit serving as a second assembly.

3. The magnetic detector according to claim 1, wherein a part of said lead frame on which said IC is mounted possesses a function of the magnetic guide.

4. The magnetic detector according to claim 3, wherein a part of said lead frame on which said IC is mounted is located adjacent to said magnet so as to be in contact with said magnet.

* * * * *